(No Model.)
C. C. DEDERMICK.
EXPANSIBLE WEDGE FOR OPENING SAW KERFS.
No. 249,315. Patented Nov. 8, 1881.
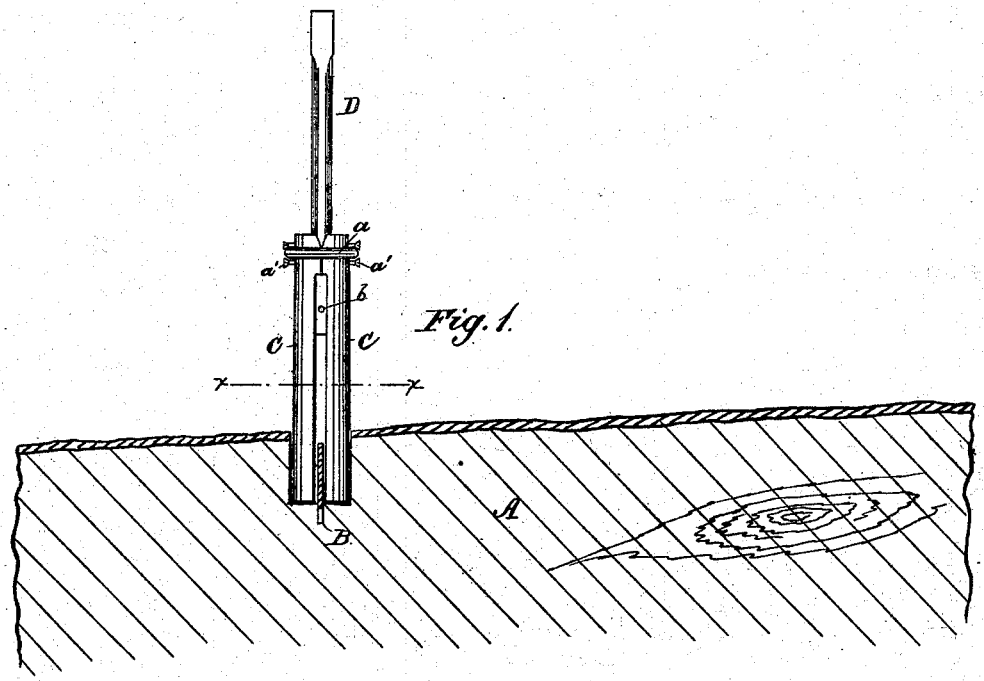
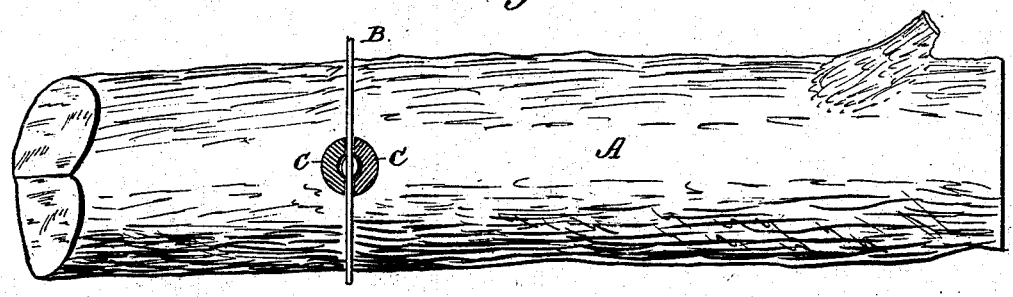
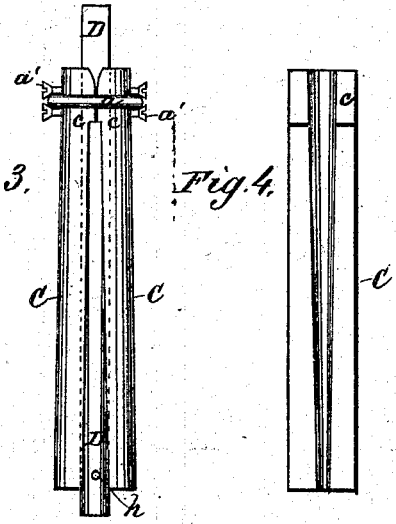
WITNESSES:
W. W. Hollingsworth
Edw. W. Byrn
INVENTOR:
C. C. Dedermick
BY
ATTORNEYS.

UNITED STATES PATENT OFFICE.

COULDER C. DEDERMICK, OF FOWLER, MICHIGAN, ASSIGNOR TO HIMSELF AND FREDERICK WOLFF, OF SAME PLACE.

EXPANSIBLE WEDGE FOR OPENING SAW-KERFS.

SPECIFICATION forming part of Letters Patent No. 249,315, dated November 8, 1881.

Application filed September 9, 1881. (No model.)

*To all whom it may concern:*

Be it known that I, COULDER C. DEDERMICK, of Fowler, in the county of Clinton and State of Michigan, have invented a new and Improved Device for Preventing the Binding or Pinching of Saws; and I do hereby declare that the following is a full, clear, and exact description of the same, reference being had to the accompanying drawings, forming part of this specification, in which—

Figure 1 is a side view of the device, showing it in position in a log. Fig 2 is a top view of the log, with the device in cross-section through the line $x$ $x$ of Fig. 1. Fig. 3 is an enlarged side view of the device with its two sections expanded by the descent of the stem. Fig. 4 is an inside view of one of the sections.

The object of my invention is to provide a device for preventing a log while being sawed from binding or pinching the saw as the latter passes through it; and to this end it consists in two jaws, having each its lower end thicker than its upper end, which jaws are connected loosely together at the top, and are combined with a central stem or follower, which, by passing down between the jaws, spreads the latter and causes them to expand the saw-kerf, the said semi-cylindrical jaws having their inner edges straight to the end, so as to form an outlet for the saw as it progresses in its cutting action, and being designed to be seated in a hole, which is first bored where the cut is to be made, as hereinafter more fully described.

In the drawings, A represents a portion of a log of wood partially cut in two, and B is the saw-blade in the kerf.

C C are the two jaws, which are semi-cylindrical on their outer surfaces, and are connected together loosely at the top by a ring, $a$, held between screws $a'$ $a'$, or by other equivalent device.

D is the stem or follower, which is made of steel, and is cylindrical in shape, and has at its lower end a cross-pin, $b$, which rests between the two jaws to guide the follower in its descent. The jaws C C are to be made of malleable iron, and have each upon its longitudinal inner face a groove, which corresponds to the semi-circumference of the follower, and in which the follower moves. This groove at its lower end becomes shallower, or runs out into the plane of the inner face of the jaws, or nearly so, so that when the follower descends it shall spread apart the lower ends of the jaws. At the upper end of the jaws, where they are connected by the ring, they are formed with abutting faces $c$ $c$, having curved upper ends, which faces prevent the jaws from pinching the pin $d$ of the follower and form a pivotal abutment, about which the jaws move in expanding.

Now, in making use of my invention a hole is first bored by an auger in the log, where it is to be cut off, of a size to receive the lower end of the jaws, which are then placed in said hole. The follower is now raised and the saw inserted between the jaws, as in Fig. 1, and the sawing commenced. Now, as the kerf deepens, the follower, moving down between the jaws, continually passes down into the lower portion of the internal groove in the same, where the groove is shallower and the metal of the jaws thicker, and the result is that the jaws are spread apart, the saw-kerf opened, and all pinching or binding of the saw obviated. If the follower does not move down of its own gravity with sufficient readiness, it may be tapped by a hammer or other tool from time to time.

Having thus described my invention, what I claim as new is—

1. The combination, with a follower, of a pair of jaws loosely connected at the top about the follower, and having their inner faces running straight to the lower end, and thicker at their lower portions in the line where the follower bears against them than they are at the top, whereby the jaws are expanded by the descent of the follower, substantially as described.

2. A pair of semi-cylindrical jaws loosely connected at the top, and having straight inner faces running out to their lower ends, and having each a longitudinal groove in its inner face of less depth at the bottom than at the top, in combination with a central stem or follower, as and for the purpose described.

COULDER C. DEDERMICK.

Witnesses:
J. S. SHRAFT,
W. W. SMITH,